(12) United States Patent
Tejeda Núñez et al.

(10) Patent No.: US 12,428,994 B2
(45) Date of Patent: Sep. 30, 2025

(54) SYSTEM AND METHOD FOR LIQUID FUEL FLUSHING FOR DUAL FUEL TURBINES

(71) Applicant: GE Infrastructure Technology LLC, Greenville, SC (US)

(72) Inventors: Ely Edgardo Tejeda Núñez, Queretaro (MX); James A. Simmons, Tampa, FL (US); Jose Carlos Sanchez Herrera, Queretaro (MX); Roberto Il Ovando Dominguez, Queretaro (MX); Carolina Ledesma Prieto, Queretaro (MX); Jorge Alejandro Palacios Salazar, Queretaro (MX); Ileana Betsabé Valenzuela García, Quertaro (MX); Yulimar Lorena Roa Teran, Queretaro (MX)

(73) Assignee: GE INFRASTRUCTURE TECHNOLOGY LLC, Greenville, SC (US)

( * ) Notice: Subject to any disclaimer, the term of this patent is extended or adjusted under 35 U.S.C. 154(b) by 0 days.

(21) Appl. No.: 18/503,506

(22) Filed: Nov. 7, 2023

(65) Prior Publication Data
US 2025/0146667 A1 May 8, 2025

(51) Int. Cl.
*F02C 7/22* (2006.01)
*F02C 3/20* (2006.01)
*F23K 5/18* (2006.01)
*F23R 3/36* (2006.01)

(52) U.S. Cl.
CPC ............. *F02C 7/22* (2013.01); *F02C 3/20* (2013.01); *F23K 5/18* (2013.01); *F23K 2300/202* (2020.05); *F23K 2300/203* (2020.05); *F23R 3/36* (2013.01)

(58) Field of Classification Search
CPC .... F02C 3/20; F02C 7/22; F02C 7/232; F02C 7/30; F23K 5/18; F23K 2300/20; F23K 2300/202; F23K 2300/203; F23R 3/36
See application file for complete search history.

(56) References Cited

U.S. PATENT DOCUMENTS

| 3,748,576 A | * | 7/1973 | Sigournay | G01N 15/0656 |
| | | | | 200/61.07 |
| 3,813,299 A | | 5/1974 | Bugor | |
| 5,241,814 A | * | 9/1993 | Butler | F02C 7/14 |
| | | | | 60/39.08 |
| 2006/0150631 A1 | | 7/2006 | Smith et al. | |

(Continued)

FOREIGN PATENT DOCUMENTS

| EP | 4 001 615 A1 | 5/2022 |
| KR | 101735562 B1 | 5/2017 |

OTHER PUBLICATIONS

Extended European Search Report, EP 24206770.0, dated Mar. 26, 2025 (11 pp.).

*Primary Examiner* — Scott J Walthour
(74) *Attorney, Agent, or Firm* — Eversheds Sutherland (US) LLP

(57) ABSTRACT

The present application provides a liquid fuel flushing circuit for a turbine engine with a flow of liquid fuel. The liquid fuel flushing circuit includes a liquid fuel boost skid in communication with the turbine engine and a liquid fuel flushing skid in communication with the turbine engine. The liquid fuel boost skid and the liquid fuel flushing skid include a recirculation loop for the flow of liquid fuel.

13 Claims, 4 Drawing Sheets

(56) References Cited

U.S. PATENT DOCUMENTS

| | | | |
|---|---|---|---|
| 2007/0101720 A1* | 5/2007 | Kunkle | F23C 1/08 |
| | | | 60/646 |
| 2011/0309013 A1* | 12/2011 | Elder | F02C 7/22 |
| | | | 210/456 |
| 2016/0305276 A1 | 10/2016 | Meisl et al. | |
| 2017/0107908 A1 | 4/2017 | Varillas et al. | |
| 2017/0333814 A1 | 11/2017 | Yancy et al. | |
| 2019/0137104 A1 | 5/2019 | Jain et al. | |

\* cited by examiner

SYSTEM AND METHOD FOR LIQUID FUEL FLUSHING FOR DUAL FUEL TURBINES

TECHNICAL FIELD

The present application and the resultant patent relate generally to turbine engines and more particularly relate to systems and methods for simultaneous liquid fuel flushing while running on gas fuels for dual fuel aeroderivative turbine engines and the like.

BACKGROUND

One of the primary advantages of a gas turbine engine is the ability to run on a variety of fuels. This is particularly advantageous in parts of the world that suffer from normal or seasonal shortages of various fuels or have an abundance of multiple different fuel types. As a result, many power plant owners operate gas turbine engines capable of burning multiple fuel combinations. For example, some gas turbine engines burn gaseous fuels such as natural gas, LNG, LPG (propane and butane) and the like as a primary fuel and liquid fuels such as diesel, biodiesel, ethanol, methanol, distillates, and the like as a backup fuel. Preferably, the gas turbine engine is able to automatically transfer between fuel types without interruption.

The equipment in a liquid fuel circuit generally must be thoroughly flushed before first use and/or after an extended shutdown. Such procedures are generally required to ensure compliance with international standards on liquid fuel cleanliness. These procedures, however, are generally time consuming and may require an extended shut down of the gas turbine engine with the associated loss of production.

SUMMARY

The present application and the resultant patent thus provide a liquid fuel flushing circuit for a turbine engine with a flow of liquid fuel. The liquid fuel flushing circuit may include a liquid fuel boost skid in communication with the turbine engine and a liquid fuel flushing skid in communication with the turbine engine. The liquid fuel boost skid and the liquid fuel flushing skid include a recirculation loop for the flow of liquid fuel therethrough The present application and the resultant patent further provide a method of flushing a liquid fuel in a turbine engine. The method may include the steps of placing a liquid fuel manifold of the turbine engine and a liquid fuel flushing skid in a recirculation loop, counting particles in the liquid fuel flowing through the liquid fuel flushing skid, flowing the liquid fuel through a filtering system in the liquid fuel flushing skid, and recirculating the liquid fuel through the liquid fuel manifold of the turbine engine and the liquid fuel flushing skid.

The present application and the resultant patent further provide a liquid fuel flushing circuit for a turbine engine. The liquid fuel flushing circuit includes a liquid fuel boost skid in communication with the turbine engine and a liquid fuel flushing skid in communication with the turbine engine. The liquid fuel flushing skid includes a particle counter and a filtering system. The liquid fuel boost skid and the liquid fuel flushing skid include a recirculation loop.

These and other features and improvements of this application and the resultant patent will become apparent to one of ordinary skill in the art upon review of the following detailed description when taken in conjunction with the several drawings and the appended claims.

DETAILED DESCRIPTION

Figure 1:
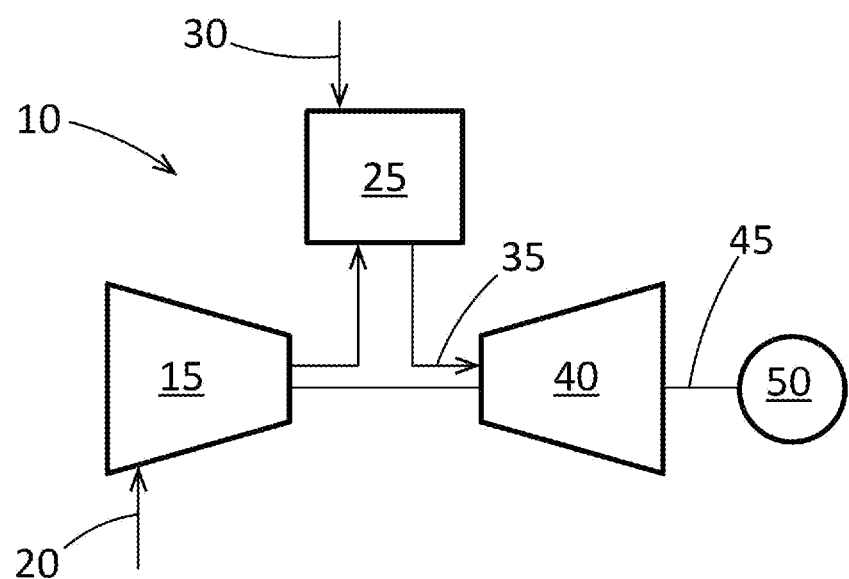
FIG. 1 is a schematic diagram of a gas turbine engine including a compressor, a combustor, a turbine, and an external load.

Referring now to the drawings, in which like numerals refer to like elements throughout the several views, FIG. 1 shows a schematic diagram of a gas turbine engine 10 as may be described herein. The gas turbine engine 10 may include a compressor 15. The compressor 15 compresses an incoming flow of air 20. The compressor 15 delivers the compressed flow of air 20 to a number of combustor cans 25. The combustor cans 25 mix the compressed flow of air 20 with a pressurized flow of fuel 30 and ignite the mixture to create a flow of hot combustion gases 35. Although only a single combustor can 25 is shown, the gas turbine engine 10 may include any number of combustor cans 25 positioned in a circumferential array and the like. Alternatively, the combustor 25 may be an annular combustor. The flow of combustion gases 35 is in turn delivered to a turbine 40. The flow of combustion gases 35 drives the turbine 40 to produce mechanical work. The mechanical work produced in the turbine 40 drives the compressor 15 via a rotor shaft 45. The turbine 40 and the rotor shaft 45 also may drive an external load 50 such as an electrical generator and the like.

As described above, the gas turbine engine 10 may use natural gas, various types of syngas, hydrogen fuel, liquid fuels, and/or other types of fuels and blends thereof. The gas turbine engine 10 may be any one of a number of different gas turbine engines offered by General Electric Company of Schenectady, New York, including, but not limited to, those such as a 7-series or a 9-series heavy duty gas turbine engine as well as LM 2500, TM2500, LM6000, LMS100, and LM9000 aeroderivative gas turbine engines and the like. The gas turbine engine 10 may be part of a simple cycle or a combined cycle power generation system or other types of generation systems. The gas turbine engine 10 may have different configurations and may use other types of components. Other types of gas turbine engines also may be used herein. Multiple gas turbine engines, other types of turbines, and other types of power generation equipment also may be used herein together.

Figure 2:
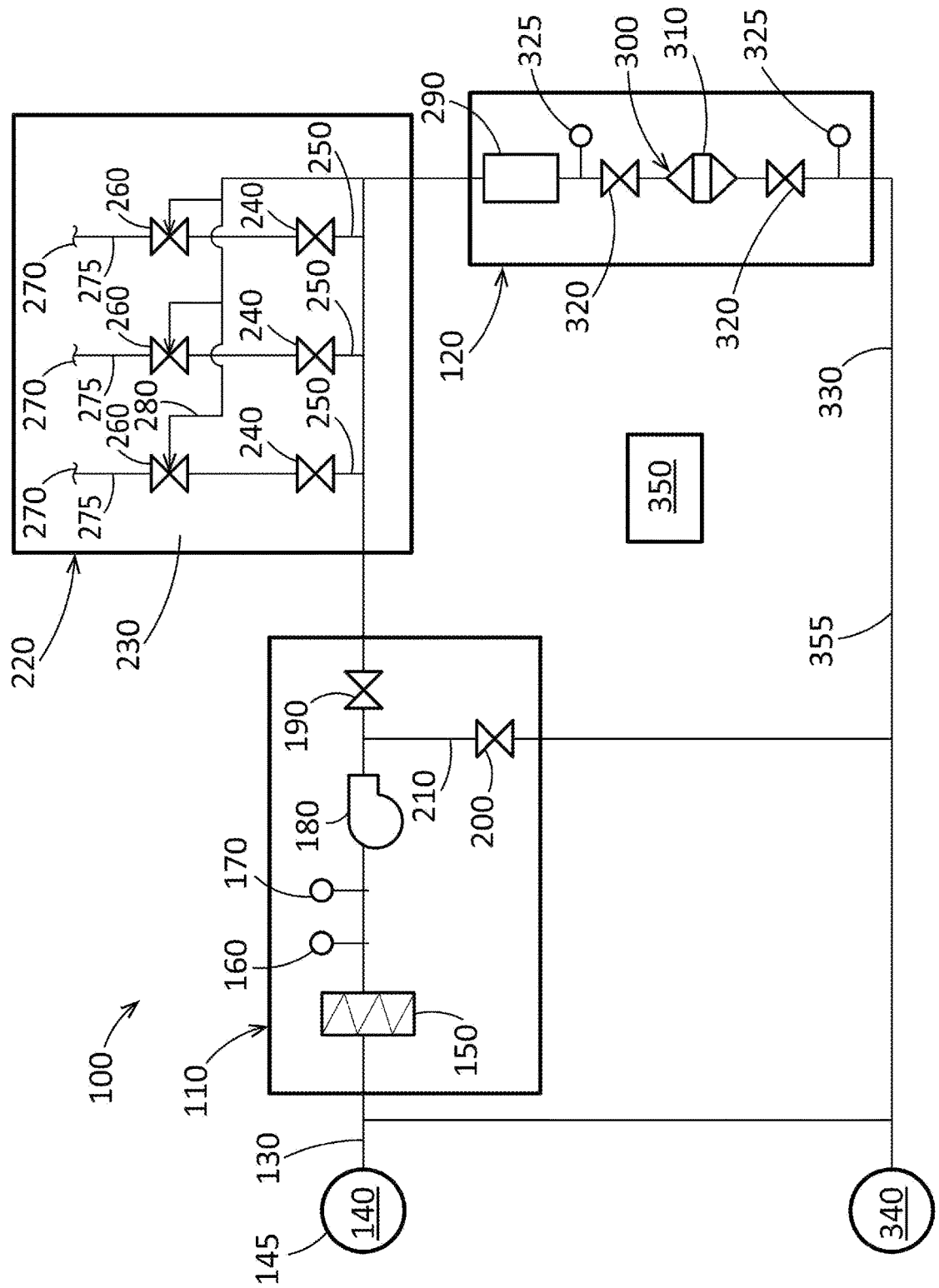
FIG. 2 is a schematic diagram of a liquid fuel flushing circuit as may be described herein, including portion of the gas turbine engine, a liquid fuel boost skid, and a liquid fuel flushing skid.

FIG. 2 is a schematic diagram of a liquid fuel flushing circuit 100 as may be described herein. The liquid fuel flushing circuit 100 may include components of the gas turbine engine 10 used to deliver the flow of fuel 30 to the combustor 25, a liquid fuel boost skid 110, and a liquid fuel flushing skid 120. Other components and other configurations may be used herein.

The liquid fuel boost skid 110 delivers the flow of fuel 30 to the components of the gas turbine engine 10 at the appropriate temperature and pressure. The liquid fuel boost skid 110 includes a main liquid fuel pipe 130 in communication with a liquid fuel supply 140 with a flow of a liquid fuel 145 therein. The liquid fuel boost skid 110 may include a number of components in communication with the main liquid fuel pipe 130. For example, the liquid fuel boost skid 110 may include a heater 150, one or more differential pressure sensors 160, one or more temperature sensors 170, and a pump 180. The components of the liquid fuel boost skid 110 skid may be of conventional design. The liquid fuel boost skid 110 may include a number of solenoid valve 190 and flow control valves 200. The solenoid valves 190 may be conventional on/off devices. The flow control valves 200 may be in communication with the main liquid fuel pipe 130 via flow control valve tubing 210 and the like. Other components and other configurations may be used herein.

The liquid fuel flushing circuit 100 also may include a liquid fuel manifold 220 with a number of the components of the gas turbine engine 10. The liquid fuel manifold 220 may be positioned within a turbine compartment 230 enclosing the gas turbine engine 10 in whole or in part. The liquid fuel manifold 220 may include a number of metering valves 240. The metering valves 240 may be of conventional design. The metering valves 240 may be in communication with the main liquid fuel pipe 130 via metering valve tubing 250 and the like. Each metering valve 240 may be in communication with a three way bypass valve 260. The three way bypass valve 260 may be of conventional design. Each three way bypass valve 260 may be in communication with an engine connection 270 via an engine line 275 in one direction and a bypass line 280 in the other. Other components and other configurations may be used herein.

Figure 3A:
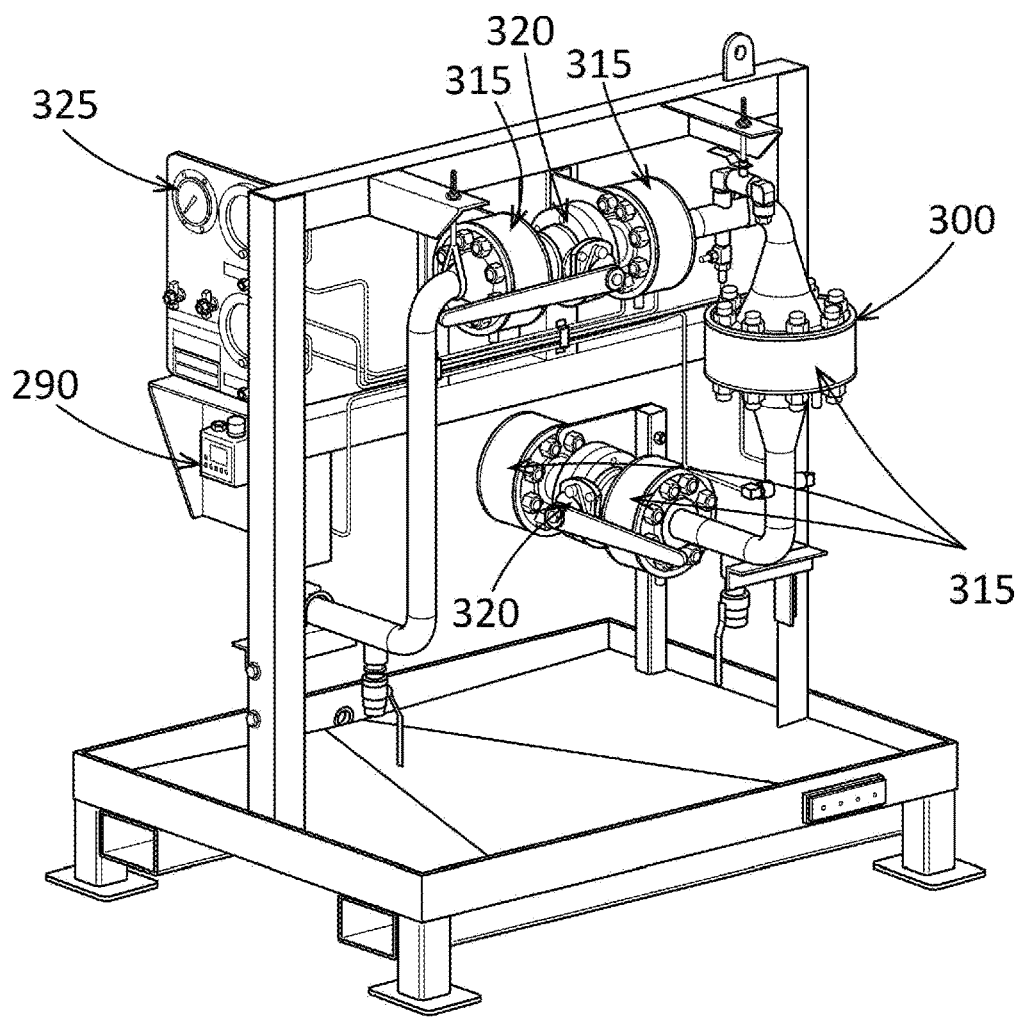
FIG. 3A is a perspective view of an example of the liquid fuel flushing skid of FIG. 2.
Figure 3B:
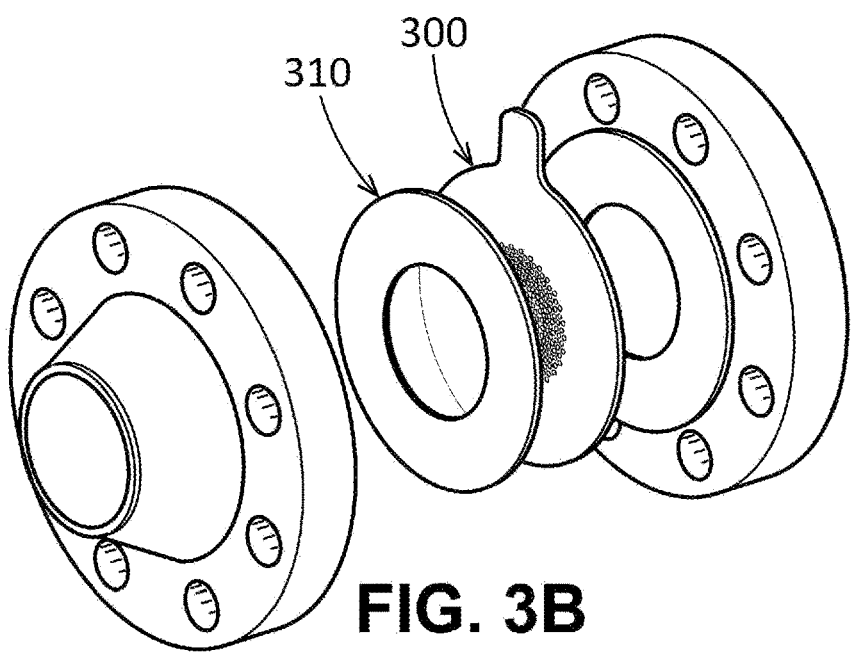
FIG. 3B is an exploded view of a mesh filtering system of the liquid fuel flushing skid of FIG. 3A.

The liquid fuel flushing skid 120 may be in communication with the liquid fuel manifold 220 and the liquid fuel boost skid 110. As is also shown in FIGS. 3A and 3B, the liquid fuel flushing skid 120 may (or may not) include a particle counter 290. The particle counter 290 may be of conventional design and may count the solid particles in the flow of liquid fuel 145. The liquid fuel flushing skid 120 may include a mesh filtering system 300. The mesh filtering system 300 may use mesh filters 310 of differing sizes depending upon the desired particle size. Other types of filtering systems may be used herein. The mesh filter 310 of the mesh filtering system 300 may have a horizontal position for ease of removal and cleaning without spilling the debris. Flange seals 315 may be incorporated for safety while the liquid fuel flushing process is ongoing with the gas turbine engine 10 running on gas fuel. An isolation valve 320 may be positioned on either side of the mesh filtering system 300. Likewise, filtering system pressure sensors 325 may be used to determine the pressure differential across the mesh filtering system 300. Other components and other configurations may be used herein.

The liquid fuel flushing skid 120 may be in communication with the liquid fuel boost skid 110 via a recirculation line 330. The liquid fuel 145 may return to the main liquid fuel pipe 130 or may be diverted to a drain 340 or other source. The flow control valve tubing 210 also may be in communication with the recirculation line 330.

Operation of the liquid fuel flushing circuit 100 may be governed by a controller 350. Generally described, the controller 350 is a conventional processor based system. The controller 350 may include a memory, an input/output (I/O) interface, an external I/O device/resource, and an external storage system. In general, the controller 350 executes computer program code that may be stored in the memory and/or the storage system. The controller 350 is only an example of various possible combinations of hardware and software that may be used herein.

In use, the liquid fuel flushing circuit 100 may fully operate while the gas turbine engine 10 is operating on gas fuel. The liquid fuel flushing circuit 100 may have several flushing phases using distinct closed recirculation loops 355 to flush specific parts of the liquid fuel flushing circuit 100 in order to meet international standards on fuel cleanliness.

In one phase, the main object would be to clean the main liquid fuel pipe 130. The metering valve tubing 250 in the turbine compartment 230 may be disconnected between the main liquid fuel pipe 130 and the metering valves 240, thus isolating the liquid fuel flushing circuit 100 from the gas turbine engine 10. Likewise, the flow control valve tubing 210 may be disconnected from the flow control valves 200 and the recirculation line 330. The metering valve tubing 250 and the flow control valve tubing 210 may be cleaned by hand to appropriate standards. The flow of liquid fuel 145 thus recirculates from the main liquid fuel pipe 130 to the liquid fuel flushing skid 120 and back to the main liquid fuel pipe 130 via the recirculation line 330.

The controller 350 may determine the current flushing phase following operator input, the appropriate size of the mesh filter 310, and the appropriate running time. Given such, the mesh filter 310 of the mesh filtering system 300 is sized for the appropriate particle size while the particle counter 290 counts the solid particles flowing therethrough. The controller 350 may run different flushing phases based on operator input. The time each phase may be run is determined by the operator and may be introduced through the human/machine interface, which depicts the system arrangement based on the flushing phase and current state of the system (temperatures, pressures, and valves status). After a predetermined amount of time, the mesh filter 310 may be removed and visually inspected. If debris is found, the mesh filter 310 may be cleaned and reinstalled. The pressure across the mesh filtering system 300 also may monitored via the filtering system pressure sensors 325 to ensure that the pressure differential is within safe boundaries. The recirculation procedures may then resume. This process may continue until no or little debris is found on the mesh filter 310 and/or the particle count determined by the particle counter 290 reaches an acceptable level under international standards.

A further phase may focus on cleaning the metering valves 240 and the three way bypass valves 260. The second phase may not be initiated until the previous phase has been completed and validated. The metering valve tubing 250 and the flow control valve tubing 210 may be reinstalled. The three way bypass valves 260 may be switched to connect to the bypass line 280 and/or the engine lines 275 may be removed to allow the gas turbine engine 10 to operate safely with gas fuel while the controller 350 constantly monitors the overall operation of the flushing process. The controller 350 may stop the process if any parameter falls out of a safe range of parameters. The liquid fuel 145 thus flows through the main liquid fuel pipe 130 and into the liquid fuel manifold 220 in the turbine compartment 230. The liquid fuel 145 flows through the metering valves 240, the three way bypass valves 260, and into the bypass line 280. The liquid fuel 145 then may flow through the liquid fuel flushing skid 120 and return to the main liquid fuel pipe 130 via the recirculation line 330.

The controller 350 may determine the current flushing phase, the appropriate size of the mesh filter 310, and the appropriate running time. Given such, the mesh filter 310 of the mesh filtering system 300 is sized for the appropriate particle size while the particle counter 290 counts the solid particles flowing therein. After a predetermined amount of time, the mesh filter 310 may be removed and visually inspected. If debris is found, the mesh filter 310 may be cleaned and reinstalled. The pressure across the mesh filtering system 300 also may monitored via the filtering system pressure sensors 325 to ensure that the pressure differential is within safe boundaries. The recirculation procedures then may resume.

Figure 4:
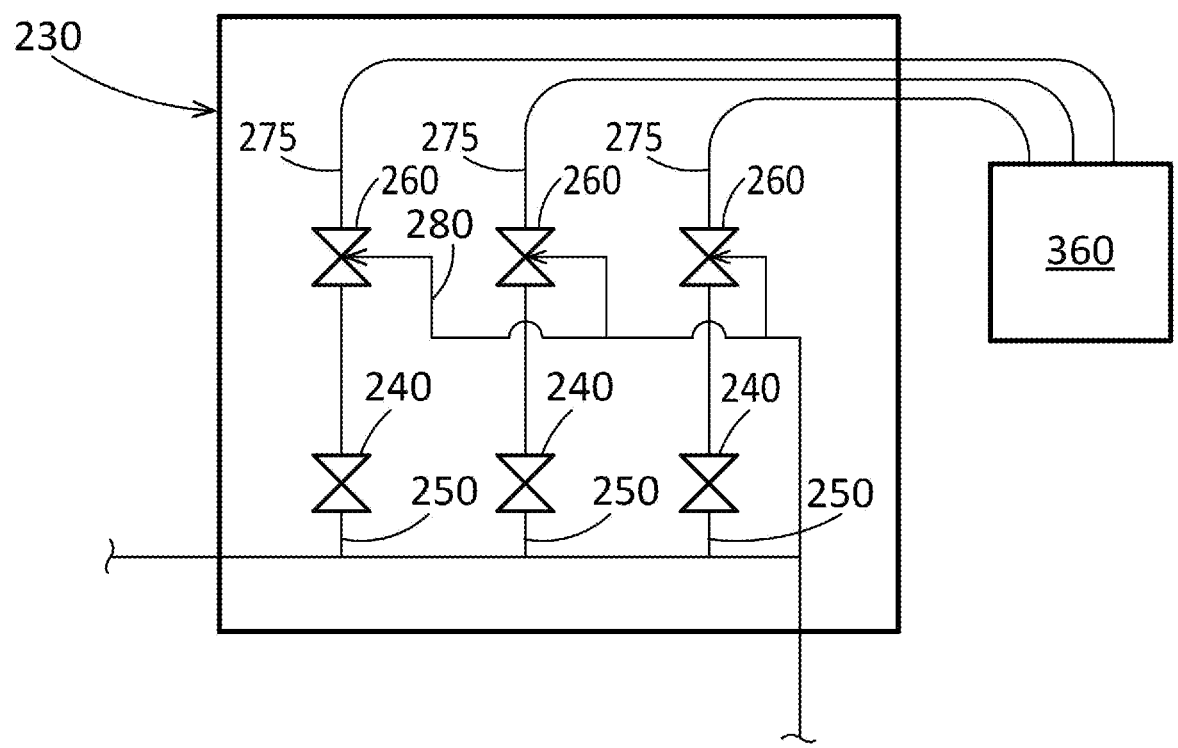
FIG. 4 is a partial schematic diagram of an alternative embodiment of a liquid fuel flushing circuit as may be described herein.

FIG. 4 shows a further example phase. In this phase, the engine lines 275 may be cleaned. Moreover, in this phase the gas turbine engine 10 is not running and the liquid fuel flushing skid 120 is not used. The engine lines 275 may be disconnected from the engine connections 270 and run to an external waste tank 360. The liquid fuel 145 flowing into the external waste tank 360 may be observed for debris therein. Laboratory analysis also may be conducted to again confirm conformance with international cleanliness standards.

The liquid fuel flushing circuit 100, in combination with the outputs of the controller 350, thus provide semi-automated procedures for liquid fuel flushing to meet international liquid fuel cleanliness standards. Importantly, the liquid fuel flushing circuit 100 may operate when the gas turbine engine 10 is operating on gas fuel so as to reduce the downtime typically associated with installation and commissioning time and other types of flushing procedures. This continued operation is a significant benefit to the plant operator. Further, the use of the particle counter 290 and the mesh filtering system 300 in the liquid fuel flushing skid 120 reduces the human error factor, increases the feedback provided to the operator, reduces hazardous areas, and increases the effectiveness and efficiency of the overall flushing process.

Specifically, the liquid fuel flushing circuit 100 thus provides the combination of a system and methodology to perform the cleaning of the liquid fuel circuit for an aeroderivative gas turbine with dual fuel capability. The method includes in a semi-automatic sequence that can be executed while the gas turbine is operating with gas fuel, without shutting-off the engine.

It should be apparent that the foregoing relates only to certain embodiments of this application and resultant patent. Numerous changes and modifications may be made herein by one of ordinary skill in the art without departing from the general spirit and scope of the invention as defined by the following claims and the equivalents thereof.

Further aspects of the invention are provided by the subject matter of the following clauses:

1. A liquid fuel flushing circuit for a turbine engine with a flow of liquid fuel, comprising: a liquid fuel boost skid in communication with the turbine engine; and a liquid fuel flushing skid in communication with the turbine engine; wherein the liquid fuel boost skid and the liquid fuel flushing skid comprise a recirculation loop for the flow of liquid fuel.
2. The liquid fuel flushing circuit of any preceding clause, wherein the liquid fuel flushing skid comprises a particle counter.
3. The liquid fuel flushing circuit of any preceding clause, wherein the liquid fuel flushing skid comprises a filtering system.
4. The liquid fuel flushing circuit of any preceding clause, wherein the filtering system comprises a mesh filter.
5. The liquid fuel flushing circuit of any preceding clause, wherein the filtering system accommodates mesh filters of a plurality of different mesh sizes.
6. The liquid fuel flushing circuit of any preceding clause, wherein the liquid fuel flushing skid comprises one or more pressure sensors positioned about the filtering system.
7. The liquid fuel flushing circuit of any preceding clause, wherein the liquid fuel boost skid comprises a heater and a pump.
8. The liquid fuel flushing circuit of any preceding clause, wherein the liquid fuel boost skid comprises a flow control valve with detachable flow control valve tubing.
9. The liquid fuel flushing circuit of any preceding clause, further comprising a liquid fuel manifold in communication with the liquid fuel boost skid and the liquid fuel flushing skid.
10. The liquid fuel flushing circuit of any preceding clause, wherein the liquid fuel manifold comprises a metering valve with detachable metering valve tubing.
11. The liquid fuel flushing circuit of any preceding clause, wherein the liquid fuel manifold comprises a three way bypass valve in communication with the metering valve.
12. The liquid fuel flushing circuit of any preceding clause, wherein the three way bypass valve is in communication with an engine connection and a bypass line.
13. The liquid fuel flushing circuit of any preceding clause, wherein the three way bypass valve is in communication with the engine connection via an engine line.
14. The liquid fuel flushing circuit of any preceding clause, wherein the three way bypass valve is in communication with an external waste tank via an engine line.
15. A method of flushing a liquid fuel in a turbine engine, comprising: placing a liquid fuel manifold of the turbine engine and a liquid fuel flushing skid in a recirculation loop; counting particles in the liquid fuel flowing through the liquid fuel flushing skid; flowing the liquid fuel through a filtering system in the liquid fuel flushing skid; and recirculating the liquid fuel through the liquid fuel manifold of the turbine engine and the liquid fuel flushing skid.
16. A liquid fuel flushing circuit for a turbine engine, comprising: a liquid fuel boost skid in communication with the turbine engine; a liquid fuel flushing skid in communication with the turbine engine; the liquid fuel flushing skid comprising a particle counter and a filtering system; and wherein the liquid fuel boost skid and the liquid fuel flushing skid comprise a recirculation loop.
17. The liquid fuel flushing circuit of any preceding clause, wherein the filtering system comprises a mesh filter.
18. The liquid fuel flushing circuit of any preceding clause, wherein the filtering system accommodates mesh filters of a plurality of different mesh sizes.
19. The liquid fuel flushing circuit of any preceding clause, wherein the liquid fuel flushing skid comprises one or more pressure sensors positioned about the filtering system.

20. The liquid fuel flushing circuit of any preceding clause, further comprising a liquid fuel manifold in communication with the liquid fuel boost skid and the liquid fuel flushing skid.

We claim:

1. A liquid fuel flushing circuit for a turbine engine with a flow of liquid fuel, comprising:
   a liquid fuel boost skid configured to be in communication with the turbine engine;
   a liquid fuel flushing skid configured to be in communication with the liquid fuel boost skid, wherein the liquid fuel manifold comprises a metering valve with detachable metering valve tubing;
   the liquid fuel flushing skid comprising, in series, a liquid fuel particle counter and a downstream mesh filtering system; and
   a liquid fuel manifold configured to be in communication with the turbine engine;
   wherein the liquid fuel boost skid and the liquid fuel flushing skid comprise a recirculation loop configured to recirculate the flow of liquid fuel through the liquid fuel boost skid and the liquid fuel flushing skid when the detachable metering valve tubing is detached between the metering valve and the liquid fuel flushing circuit to isolate the turbine engine from the flow of liquid fuel.

2. The liquid fuel flushing circuit of claim 1, wherein the filtering system accommodates mesh filters of a plurality of different mesh sizes.

3. The liquid fuel flushing circuit of claim 1, wherein the liquid fuel flushing skid comprises one or more pressure sensors positioned about the filtering system.

4. The liquid fuel flushing circuit of claim 1, wherein the liquid fuel boost skid comprises a heater and a pump.

5. The liquid fuel flushing circuit of claim 1, wherein the liquid fuel boost skid comprises a flow control valve with detachable flow control valve tubing.

6. The liquid fuel flushing circuit of claim 1, wherein the liquid fuel manifold comprises a three way bypass valve in communication with the metering valve.

7. The liquid fuel flushing circuit of claim 6, wherein the three way bypass valve is in communication with an engine connection and a bypass line.

8. The liquid fuel flushing circuit of claim 7, wherein the three way bypass valve is in communication with the engine connection via an engine line.

9. The liquid fuel flushing circuit of claim 7, wherein the three way bypass valve is in communication with an external waste tank via an engine line.

10. A turbine engine, comprising:
    a combustor;
    a liquid fuel boost skid in communication with the combustor;
    a liquid fuel flushing skid in communication with the liquid fuel boost skid;
    the liquid fuel flushing skid comprising, in series, a liquid fuel particle counter and a downstream filtering system;
    a liquid fuel manifold in communication with the turbine engine, wherein the liquid fuel manifold comprises a metering valve with detachable metering valve tubing; and
    wherein the liquid fuel boost skid and the liquid fuel flushing skid comprise a recirculation loop configured to recirculate the flow of liquid fuel through the liquid fuel boost skid and the liquid fuel flushing skid when the detachable metering valve tubing is detached between the metering valve and the liquid fuel flushing circuit to isolate the turbine engine from the flow of liquid fuel.

11. The liquid fuel flushing circuit of claim 10, wherein the filtering system comprises a mesh filter.

12. The liquid fuel flushing circuit of claim 10, wherein the filtering system accommodates mesh filters of a plurality of different mesh sizes.

13. The liquid fuel flushing circuit of claim 10, wherein the liquid fuel flushing skid comprises one or more pressure sensors positioned about the filtering system.

* * * * *